(12) United States Patent
Ojarand et al.

(10) Patent No.: US 11,585,772 B2
(45) Date of Patent: Feb. 21, 2023

(54) MICROFLUIDIC METHOD AND DEVICE

(71) Applicant: Tallinn University of Technology, Tallinn (EE)

(72) Inventors: Jaan Ojarand, Tallinn (EE); Mart Min, Tallinn (EE); Olev Märtens, Tallinn (EE)

(73) Assignee: Tallinn University of Technology, Tallinn (EE)

( * ) Notice: Subject to any disclaimer, the term of this patent is extended or adjusted under 35 U.S.C. 154(b) by 473 days.

(21) Appl. No.: 16/783,647

(22) Filed: Feb. 6, 2020

(65) Prior Publication Data

US 2020/0256816 A1     Aug. 13, 2020

(30) Foreign Application Priority Data

Feb. 8, 2019    (EE) .................................. P201900007

(51) Int. Cl.

| | |
|---|---|
| *G01N 27/28* | (2006.01) |
| *G01N 27/07* | (2006.01) |
| *G01N 27/12* | (2006.01) |
| *B01L 3/00* | (2006.01) |
| *G01N 15/10* | (2006.01) |

(52) U.S. Cl.
CPC ........ *G01N 27/07* (2013.01); *B01L 3/502715* (2013.01); *B01L 3/502753* (2013.01); *G01N 15/1056* (2013.01); *G01N 27/128* (2013.01); *B01L 2300/0645* (2013.01)

(58) Field of Classification Search
CPC .... G01N 27/07; G01N 27/026; G01N 27/041; G01N 27/048; G01N 27/12; G01N 27/121; G01N 27/122; G01N 27/125; G01N 27/128; G01N 33/15; G01N 33/24; G01N 33/246; G01N 15/1031; G01N 15/1056
See application file for complete search history.

(56) References Cited

U.S. PATENT DOCUMENTS

| | | | |
|---|---|---|---|
| 6,703,819 B2 | 3/2004 | Gascoyne et al. | |
| 7,417,418 B1 | 8/2008 | Ayliffe | |
| 8,268,152 B2 * | 9/2012 | Stelzle | ................... C12M 23/16 204/547 |

(Continued)

OTHER PUBLICATIONS

Grimnes, S. and Martinsen, Ø. G., Bioimpedance and Bioelectricity Basics, 3rd ed., Elsevier-Academic Press, 2015.

(Continued)

*Primary Examiner* — Thang X Le
(74) *Attorney, Agent, or Firm* — Meunier Carlin & Curfman LLC

(57) ABSTRACT

Microfluidic method and device that can be used for sensing and measurement of properties of liquids, gases, solutions, and particles is proposed, wherein the measurable liquid or gas (with or without particles) flow in at least one channel through a measurement chamber (cell) formed between at least two isolated electrodes is used for electrical impedance measurement. The proposed solution is characterized in that the cross-section of at least one pair of similar spatial electrodes decreases smoothly towards the tiny measurement chamber (cell) in order to increase the sensitivity and accuracy of the measurement. Typically, a device with multiple similar channels is advantageous to use for comparative measurement and differential measurement schemes.

9 Claims, 5 Drawing Sheets

(56) References Cited

U.S. PATENT DOCUMENTS

| | | | |
|---|---|---|---|
| 8,329,437 B1 | 12/2012 | Ayliffe | |
| 8,841,924 B2 | 9/2014 | Reccius | |
| 9,995,668 B2* | 6/2018 | Renaud | B01L 3/502761 |
| 2007/0163883 A1* | 7/2007 | Schnelle | B03C 5/026 |
| | | | 204/547 |
| 2011/0259120 A1* | 10/2011 | Thonstad | G01F 1/44 |
| | | | 73/861.42 |
| 2016/0299138 A1* | 10/2016 | Almasri | B03C 5/026 |
| 2018/0266937 A1* | 9/2018 | de Wagenaar | B01L 3/502761 |
| 2020/0049634 A1* | 2/2020 | Aljindan | G01N 33/1833 |

OTHER PUBLICATIONS

Min, M. et al., Impedance detection, In: Prof. Dongqing Li ed., Encyclopedia of microfluidics and nanofluidics, 2nd edition, New York: Springer, 2015, pp. 1338-1361.

Chen, J. et al., Microfluidic impedance flow cytometry enabling high-throughput single-cell electrical property characterization, Int. J. Mol. Sci. 2015, vol. 16, pp. 9804-9830.

Zheng, S., Micro coulter counters with platinum black electroplated electrodes for human blood cell sensing, Biomed Microdevices, 2008, vol. 10, pp. 221-231.

* cited by examiner

MICROFLUIDIC METHOD AND DEVICE

PRIORITY

This application claims priority of Estonian patent application number P201900007, filed on Feb. 8, 2019 the contents of which is incorporated herein by reference.

FIELD OF THE INVENTION

The invention relates to measuring techniques, more particularly to the detection and measurement of the properties of liquids, mixtures, gases, and particles (e.g., bacteria and cells) contained therein. Important uses of the invention include medical diagnostics including microfluidic and Lab-on-a-Chip-devices to detect the presence and properties of particles in liquids and gases through the electrical properties of a solution, as well as electrochemical analyzers and arrangements for the investigation and detection of liquids and gases. The main applications are the determination, counting, and sorting of the particles in solution (e.g., biological cells) as well as the type and condition of the particles (e.g., pathogenic bacteria).

BACKGROUND OF THE INVENTION

Solutions are known in which the frequency characteristics of a mixture and its particles are measured by measuring the response of the generated alternating excitation signal using the electrodes in the measurement chamber (cell) containing the mixture and subsequently calculating it. The complex value (also referred to as the vector value) obtained by the ratio of the excitation signal to the response signal indicates the electrical impedance of the mixture under investigation at the applied AC signal measurement frequency or several frequencies simultaneously if the excitation signal contains multiple frequency components (S. Grimnes, Ø. G. Martinsen, 2015. Bioimpedance and bioelectricity basics, 3rd edition Elsevier-Academic Press, M. Min, et al. 2015. Impedance detection: In: Prof. Dongqing Li ed., Encyclopedia of microfluidics and nanofluidics, 2nd edition. New York: Springer, pp. 1338-1361).

Measurement of the impedance at several different frequencies results in a complex impedance spectrum, which gives more information about the properties of the liquid and its particles. The association of the properties of a liquid, a mixture, or a gas, and the particles therein, with the impedance spectrum, is generally accomplished through an equivalent electrical model or equivalent circuit of the mixture and the particles, with electrodes in contact with the solution being also an important part of the electrical model (S. Grimnes 2015; Chen, J. et al., "Microfluidic Impedance Flow Cytometry Enabling High-Throughput Single-Cell Electrical Property Characterization Review," Int. J. Mol. Sci. 2015, 16, 9804-9830; U.S. Pat. No. 6,703,819B2) since their impedances remain in series with the impedance of the mixture to be measured. Such devices for detecting, counting and measuring the properties of mixtures and particles therein, with various electrode arrangements, are described in articles (Min 2015; Chen 2015) and U.S. patents (U.S. Pat. No. 6,703,819B2; U.S. Pat. No. 8,329,437B1; U.S. Pat. No. 7,417,418B1) whereas, in order to increase the sensitivity of particle detection, differential measurement schemes have also been proposed in which the amplitude and polarity of the signals change abruptly as the particle moves between several electrodes.

A typical frequency response curve of impedance magnitude spectrum of the measurement chamber (cell) of a microfluidic device is shown in FIG. 1A, which shows a typical frequency response of the solution impedance magnitude when the measurement chamber (cell) diameter d=1 mm, length l=1 mm and electrode area s=0.8 $mm^2$. The solution to be measured is a salt solution corresponding to a standard biological solution with a specific conductivity of 1 S/m. The first falling part of the magnitude is defined here by the electrical capacitance of the electrodes and the fluid interface, more precisely by the so-called constant phase element (CPE), due to the so-called double layer effect of the electrically charged surface of chemically inert metals, e.g., gold and platinum and solution (Min 2015; Chen 2015). For smooth and clean electrodes, CFE is approximately equivalent to electrical capacitance, with a value proportional to the electrode area. The second, falling part of the magnitude, is caused by the electrical capacitance between the electrodes, which is formed by the capacitance of the solution and the parasitic capacitance (mainly the input capacitance of the connecting wires and measurement electronics) The resistance of the solution causes the middle, horizontal part of the magnitude.

In a Lab-on-a-Chip-solutions, diminishing the physical dimensions of the measurement chamber (cell) is required for several reasons. Firstly, it is necessary for achieving sufficient sensitivity in the case of small particles (cells, bacteria, etc.) as it depends on the volume ratio of the particles to the surrounding fluid. However, for biological objects, the resistivity of a suitable solution is relatively low (~1 Ωm, specific conductivity 1 S/m), so that the effect of small particles with much higher resistance (and impedance) remains small with the larger amount of solution in the measurement chamber (cell). In many cases, the second reason is the cost of expensive reagents (antibody solutions, etc.) used in measurements. As the measurement chamber (cell) decrease, also the surface area of electrodes and their electrical capacitance decrease, leading to a shift of the first (lower frequency) incident part of the magnitude spectrum toward higher frequencies (FIG. 1B illustrating the magnitude frequency response of the complex impedance magnitude of the same solution with a smaller measurement chamber (cell) and smaller electrodes (d=0.1 mm, l=0.05 mm, s=1000 $\mu m^2$). Here, the second (higher frequency) falling part of the magnitude shifts significantly less, since the input capacitances of the measurement electronics remain approximately the same and the role of the solution capacitance is relatively small. Shifting the center part of the magnitude spectrum towards higher frequencies makes the measurement more complicated and, under other equal conditions, degrades its accuracy and resolution. The effect of parallel parasitic capacitance also increases (since this capacitance now affects the horizontal part of the spectrum more due to the proximity of the knee frequency—up to the situation where no horizontal part remains), which is often variable in temperature, the amplitude of input voltages, and finally also in time. Because the central part of the spectrum plays an important role in detecting the properties of biological objects (e.g., detecting pathogens by selective interlayer), the efficiency of the device (sensor) decreases with size reduction.

A known solution for increasing the electrode area is the use of porous electrodes (S. Zheng, "Micro Coulter Counters with Platinum Black Electroplated Electrodes for Human Blood Cell Sensing", Biomed Microdevices (2008) 10: 221-231). The disadvantages of such a solution are the increased uncertainty of the measurement results due to the long-time movement of the solution in the micropores of electrodes and the variance of that time between different electrodes. This particularly influences the results of comparative (differential) measurements. Another problem is the increased contamination of electrodes.

A known solution for the increasing of the electrode area is the use of finger-shaped electrodes (U.S. Pat. No. 8,841, 924B2). The disadvantages of this solution are the large unevenness of the current density and the impedance measurement sensitivity near the electrodes, which makes it complicated and inaccurate to relate the measurement results to the electrical model parameters of the object.

SUMMARY OF THE INVENTION

The object of the invention is to increase the sensitivity, resolution, and accuracy of the device in detecting liquids (e.g., mixtures) and particles (e.g., bacteria, cells, etc.).

The object is achieved firstly by the design of the electrodes which allows the measurement chamber (cell) to be reduced without shifting the first falling part of the impedance magnitude to higher frequencies and without significantly increasing the size of the device while reducing the measurement chamber (cell) size also increases the sensitivity of small particle detection; secondly, a channel and electrode arrangement that allows fluid or gas to flow smoothly and without turbulence in the device; thirdly, such a design of electrodes, measurement chamber (cell), and fluid channel that allows, in addition to direct measurement, to measure the difference in the properties of multiple channels of liquids, mixtures, or gases with different measuring schemes with increased sensitivity and accuracy; fourthly, such an arrangement of channels and electrodes, which provides similar characteristics and separation of the channel electrodes and measurement chambers (cell), which enables independent and effective comparison of the properties of liquids or gases under the same conditions while also allowing comparison with channels containing mixed solutions.

The object of the invention is achieved (FIG. 2A) using conductive spatial electrodes (02) with smoothly (e.g., conically) decreasing shape inside two dielectric materials (04) and (06), where in the case of vertical placement of electrodes the measurement chamber (cell) (07), (37) (FIG. 3), (47) (FIG. 4) is formed using the third layer of dielectric material (05) or in the case of horizontal placement of two joined dielectric materials (FIG. 6A) (24) and (26) in between electrodes (22) and (27). The electrodes of conically decreasing shape can, in this case, be of various shapes in the second plane—for example cylindrical (FIG. 2A), rectangular (FIG. 2B) or oval (FIG. 3C).

The important difference is that they have a significantly larger surface area than the various planar electrodes shown in the prior art and that their cross-section decreases smoothly towards the measurement chamber (cell). The larger area of the spatial electrodes is accompanied by a higher electrical capacitance, which shifts the curve of the impedance spectrum towards the lower frequencies (FIG. 1C) and allows the measurement of the resistive component at lower frequencies. The fluid or gas channels (FIGS. 2 to 6) (01), (21) may be formed from electrodes (02), (22), but also as a separate part (31), (41), if the part of the electrode (32), (42) is shorter. Electrical connections of the electrodes (03), (33), (43) (53b) are formed either in the plane of the third dielectric layer (05), (35), (45), (55) or on the outer surface (23), (53), (53a).

The devices shown in the drawings are shown with one, two, and three channels, but the number of channels may vary, with fluid inlets and outlets forming fittings and branching according to the needs of the application.

The electrode terminals may all be individually accessible, but may also be electrically connected within the device (FIG. 4) (43), and grouped according to a circuit diagram solution. For example, terminals of the excitation signal side may be connected for multiple channels if a common mode excitation signal is desired. Another example is a pair of channels where the side of the response signal is connected in parallel, but the excitation signals are applied separately in the opposite phase.

The difference with known solutions is that several channels having uniform properties and symmetrical electrodes with a smooth shape and large spatial surface area allow simultaneous measurement and comparison of differences between liquids, solutions, gases, and particles therein, including measurement of the difference of the spectra of their impedances.

On FIG. 1C the frequency response of the impedance magnitude of the solution in the case of a smaller measurement chamber (cell) but a larger area of electrodes is depicted. The larger area of the electrodes in this example is achieved with round conical electrodes having a diameter of the wider end of 0.66 mm and a length of 0.33 mm.

DETAILED DESCRIPTION OF THE INVENTION

The examples below illustrate the invention.

Figure 1A:
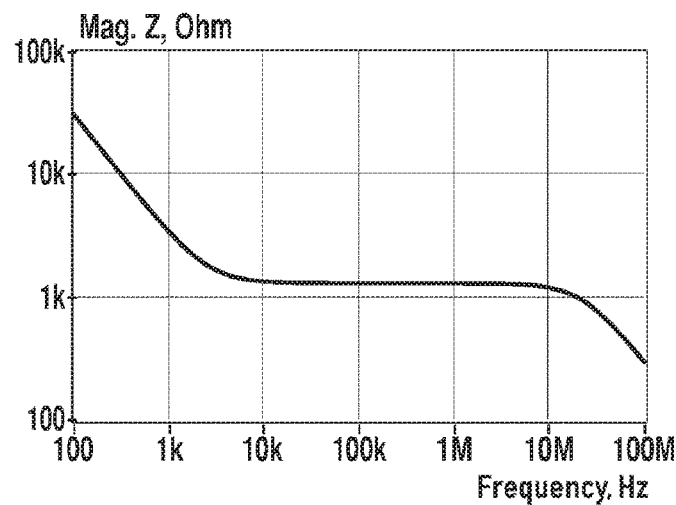
FIG. 1A shows a typical frequency response of a solution impedance magnitude in a measurement chamber (cell).
Figure 1B:
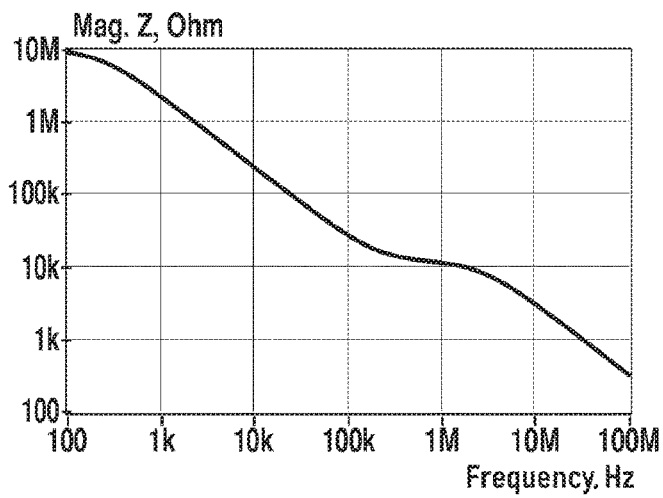
FIG. 1B shows the frequency response of the complex impedance magnitude of the same solution with a smaller measurement chamber (cell) and smaller electrodes.
Figure 1C:
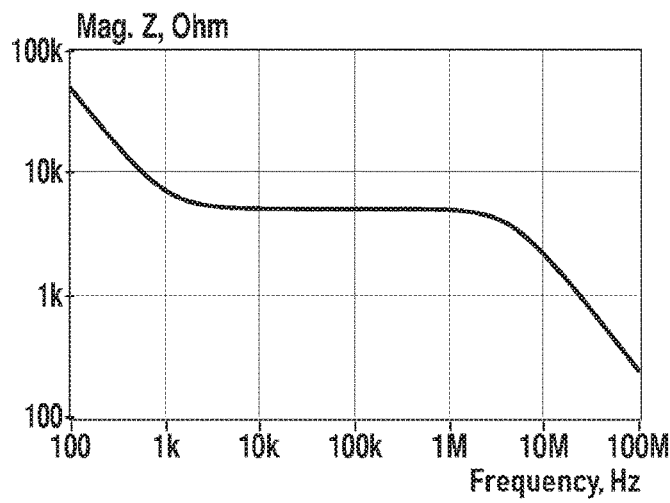
FIG. 1C shows the frequency response of the complex impedance magnitude of the solution for a smaller measurement chamber (cell), but with circular conical electrodes with the larger surface area.
Figure 2A:
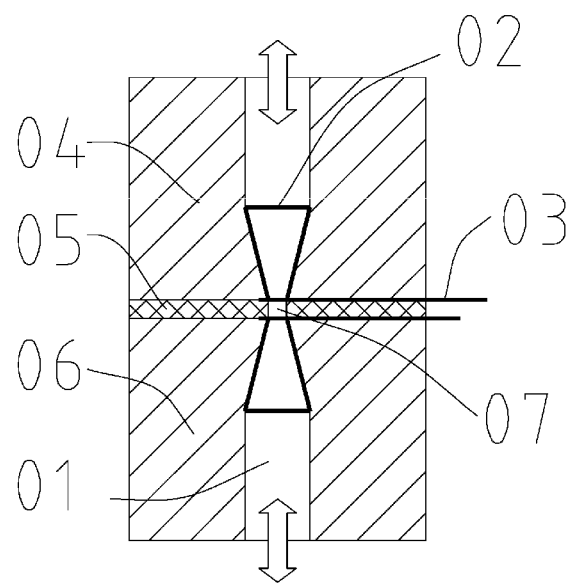
FIG. 2A is a cross-sectional front view of the proposed single-channel device with a pair of spatial conical electrodes.

FIG. 2A depicts a cross-sectional front view of a single channel (01) device with a pair of three-dimensional conical electrodes (02) in which the electrical connections (03) are made in the planes of the third dielectric material (05) between the upper (04) and lower (06) dielectric material. The opening in the dielectric material (05) between the tapered ends of the electrodes forms a measurement chamber (07). Arrows at the ends of the channel indicate the direction of movement of the liquid or gas.

Figure 2B:
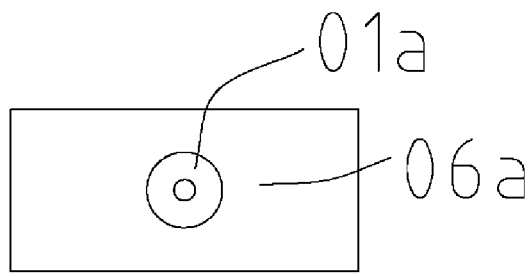
FIGS. 2B, 2C, 2D are top views of the same embodiment of a device with circular, rectangular, and oval cross-sectional of the channel, respectively.
Figure 2C:
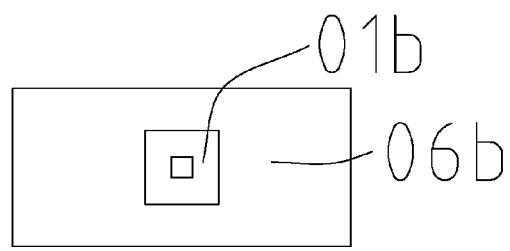
Figure 2D:
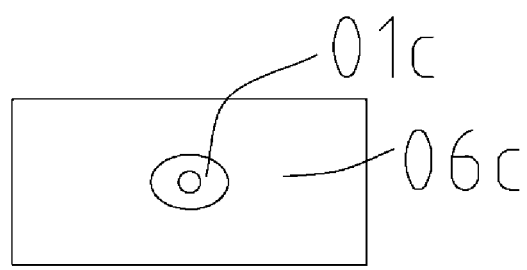

FIGS. 2B, 2C, 2D show the top views of the same device with a circular (01a), rectangular (01b), and oval (01c) channel shape, respectively.

The solution works as follows: the liquid (mixture, gas, particles, etc.) flows in the channel (01), and the AC impedance, or preferably its spectrum, measured in the measurement chamber between the electrodes (02) depends on the composition and properties of said liquid and particles, allowing them to be measured, counted or characterized using the changes of the impedance or its spectrum.

Figure 3:
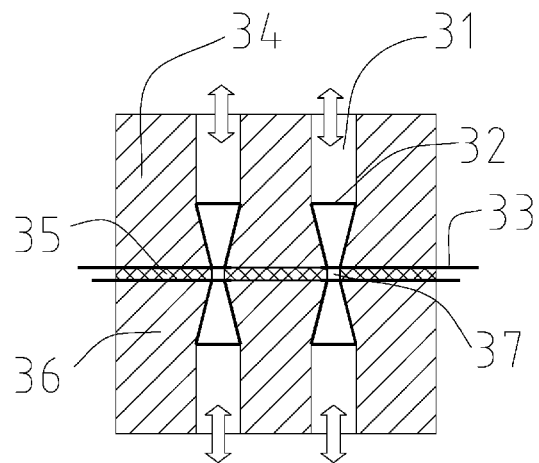
FIG. 3 is a cross-sectional front view of a dual-channel device with electrical connections for each electrode separately.

FIG. 3 shows a cross-sectional front view of an embodiment of a dual-channel device in which the electrical connections (33) of each electrode are shown separately. Note: Electrical connections may also be perpendicular to the plane of the drawing. Such a solution allows comparative measurement in two channels, for example, using one channel as a reference channel, for example, with a known liquid, mixture, or the like.

Figure 4:
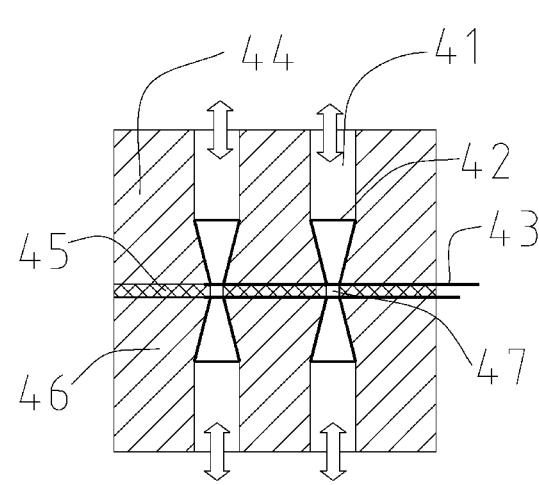
FIG. 4 is a cross-sectional front view of a dual-channel device in which the electrodes are electrically connected in pairs.

FIG. 4 shows a cross-sectional front view of a dual-channel device in which the electrical connections (43) of the electrodes are connected in pairs inside the device. Note: Electrical connections may also be perpendicular to the plane of the drawing.

Figure 5:
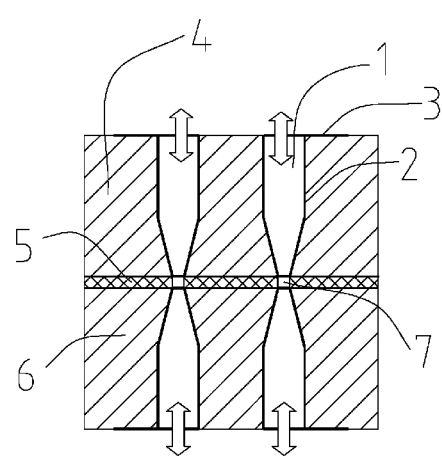
FIG. 5 is a cross-sectional front view of a two-channel device having electrical connections between the electrodes on the upper and lower surfaces of the dielectrics.

FIG. 5 shows a cross-sectional front view of a two-channel device having electrical connections (3) to the electrodes (2) on the upper and lower surfaces of the dielectric (4) and (6).

Figure 6A:
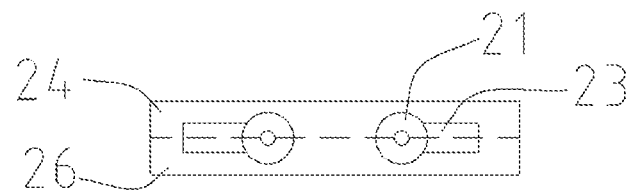
FIG. 6A is a front view of a dual-channel device having pairs of electrodes in channels between two dielectric materials.

FIG. 6A shows a front view of a dual-channel device having pairs of electrodes in the channels (21) between the two dielectric materials (24) and (26).

Figure 6B:
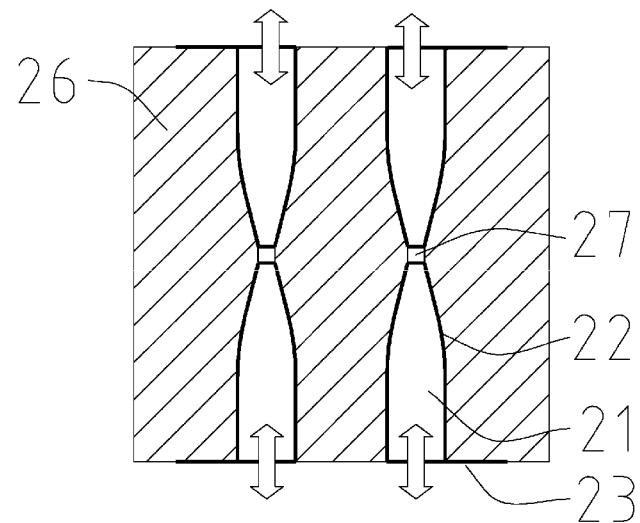
FIG. 6B is a cross-sectional top view of the same embodiment.

FIG. 6B shows a cross-sectional top view of the same device in a plane of the junction of the dielectrics (24) and (26). The measurement chambers (27) between the pairs of electrodes (22) are optionally formed by the same dielectrics (24) and (26), and the electrodes (22) are optionally convex in shape.

Figure 7:
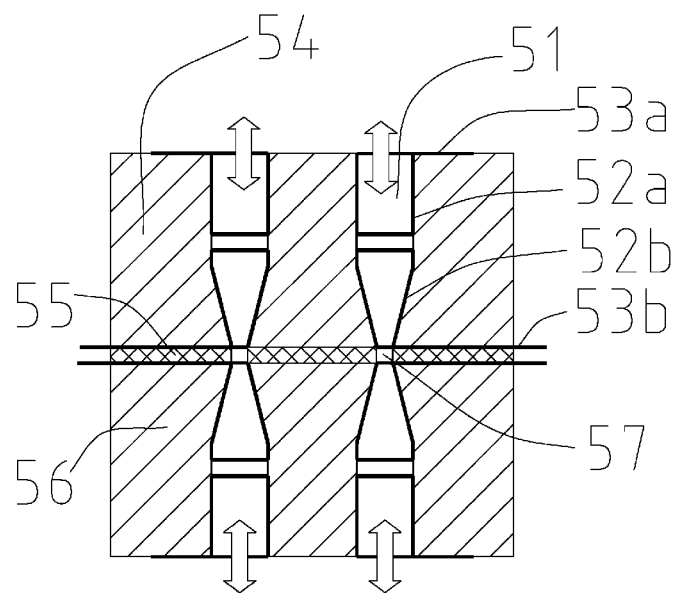
FIG. 7 is a cross-sectional front view of a dual-channel device with divided electrodes.

FIG. 7 shows a cross-sectional front view of a two-channel device in which the pairs of electrodes are divided into two to implement a so-called four-electrode impedance measurement scheme.

Figure 8A:
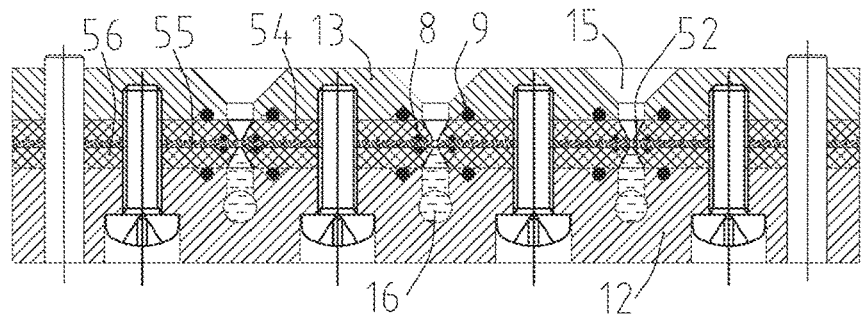
FIG. 8A is a cross-sectional front view of an embodiment of a three-channel device.
Figure 8B:
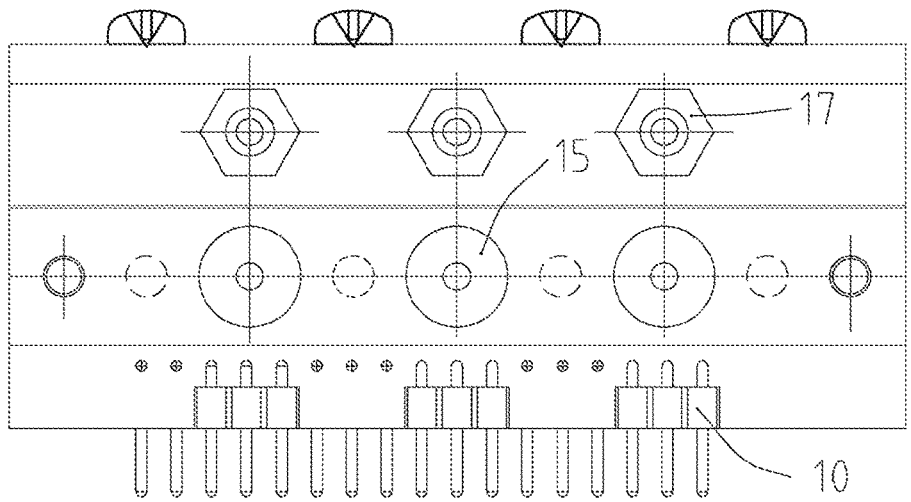
FIGS. 8B and 8C are a side view and cross-sectional side views, respectively.
Figure 8C:
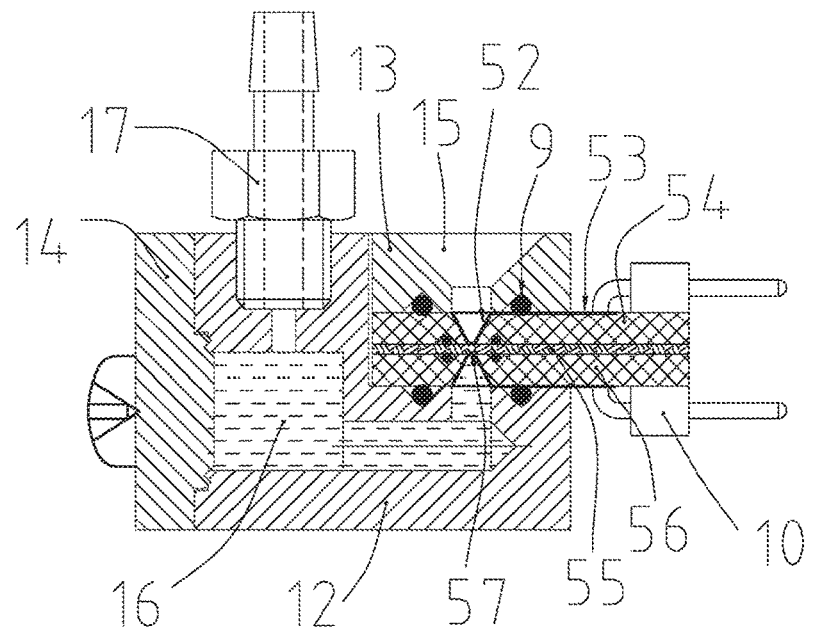

FIGS. 8A, 8B, and 8C show in more detail a three-channel embodiment example of the device. FIG. 8A is a cross-sectional front view of the device in a plane of the center of electrodes (52). O-ring seals (8) and (9) have been used to seal the channels. The upper (54) and lower (56) dielectric employ printed circuit boards having conical gold plated apertures forming pairs of electrodes (52). Measurement chambers (57) are formed by holes in a dielectric (55) located between the electrodes. FIG. 8B is a top view of the same device with connector plugs (10) and fittings (17) for connecting of fluid hoses. FIG. 8C is a cross-sectional side view of the same device in a plane of the center of one pair of electrodes (52). Electrode connections (53) extend to the connector plugs (10). The fluid reservoir is further formed with dielectric material details (12), (13) and (14) and is provided with a fitting (17) for connecting of hoses. The solution under investigation is entered into the funnel opening (15) and can be directed between the electrodes (52) of the measuring chamber (57) by applying negative pressure through the fitting, but also in the opposite direction, applying excess pressure. By changing the pressure direction, the fluid in the reservoir and between the electrodes can be moved back and forth, for example, for mixing.

The invention claimed is:

1. A microfluidic method, comprising:
a fluid or a gas under investigation flows in at least one channel,
a measurement is performed in between two spatial electrodes insulated from each other, and the measurement is accomplished in a miniature measurement chamber which is formed in between the two spatial electrodes positioned within said channel in a direction of flowing of the liquid or the gas such that the liquid or the gas flows through the two spatial electrodes, and wherein a cross-section of the two spatial electrodes is smoothly decreasing from both sides towards the miniature measurement chamber.

2. The microfluidic method, according to claim 1, wherein electrical impedance is measured between the electrodes.

3. The microfluidic method, according to claim 2, wherein the electrical impedance between the electrodes is measured at multiple frequencies as a spectrum.

4. The microfluidic method, according to claim 2, wherein the fluid or gas under investigation flows in parallel in two or more channels each having at least one pair of electrodes with the aid of which the impedance in the given channel is measured.

5. The microfluidic method, according to claim 4, wherein one fluid or one gas channel is a reference channel for comparing result of at least one other channel.

6. The microfluidic method according to claim 4, wherein differential measurement is used between two or more channels.

7. A microfluidic device comprising at least one liquid or gas channel in dielectric materials and at least one pair of spatial electrodes isolated from each other and positioned within the at least one liquid or gas channel in a direction of flowing of the liquid or the gas such that the liquid or the gas flows through the two spatial electrodes, wherein a cross-section of the at least one pair of spatial electrodes is smoothly decreasing from both sides towards a measurement chamber located in between the spatial electrodes forming the at least one pair.

8. The microfluidic device according to claim 7, wherein the electrodes with decreasing cross-section towards the measurement chamber have a conical shape.

9. The microfluidic device according to claim 7, wherein there are two or more channels containing electrode pairs for measurements.

* * * * *